United States Patent
Meier et al.

(10) Patent No.: US 7,905,309 B2
(45) Date of Patent: Mar. 15, 2011

(54) SUPPORT FOR AN AIRBAG HOUSING OF A MOTOR VEHICLE

(75) Inventors: Steffen Meier, Freudental (DE); Walter Schaupensteiner, Rutesheim (DE)

(73) Assignee: Dr. Ing. h.c. F. Porsche AG, Stuttgart (DE)

( * ) Notice: Subject to any disclaimer, the term of this patent is extended or adjusted under 35 U.S.C. 154(b) by 256 days.

(21) Appl. No.: 12/168,318

(22) Filed: Jul. 7, 2008

(65) Prior Publication Data

US 2009/0008911 A1 Jan. 8, 2009

(30) Foreign Application Priority Data

Jul. 5, 2007 (DE) .......................... 10 2007 031 406

(51) Int. Cl.
*B60K 37/00* (2006.01)
*B60R 21/16* (2006.01)
(52) U.S. Cl. ............................. 180/90; 280/728.2; 296/70
(58) Field of Classification Search ............... 280/728.2, 280/730.1, 748, 751, 752, 753; 296/1.03, 296/70, 72, 73, 187.03, 187.05, 193.02; 267/136, 267/140.11, 140.12, 189, 292, 293
See application file for complete search history.

(56) References Cited

U.S. PATENT DOCUMENTS

| | | | | | |
|---|---|---|---|---|---|
| 2,549,925 | A | * | 4/1951 | Paton | 74/493 |
| 4,000,876 | A | * | 1/1977 | Usui et al. | 248/205.1 |
| 5,934,733 | A | * | 8/1999 | Manwaring | 296/72 |
| 5,960,673 | A | * | 10/1999 | Eaton et al. | 74/492 |
| 6,276,740 | B1 | * | 8/2001 | Mellor et al. | 296/72 |
| 6,572,178 | B2 | * | 6/2003 | Hartel et al. | 296/190.08 |
| 6,733,039 | B2 | * | 5/2004 | Honda et al. | 280/780 |
| 7,134,704 | B2 | * | 11/2006 | Fischer | 296/72 |
| 2004/0080144 | A1 | * | 4/2004 | Enders | 280/728.2 |

FOREIGN PATENT DOCUMENTS

DE 10312597 A1 9/2004

* cited by examiner

*Primary Examiner* — Eric Culbreth
*Assistant Examiner* — Joseph Rocca

(57) ABSTRACT

A support for an airbag housing of a motor vehicle, in particular for a knee airbag housing, has a support strut which is connected to the airbag housing. The support strut is mounted in a carrying frame of the vehicle by at least one elastic element. As a result of the mounting of the support strut by way of the elastic element, connecting elements, for example screws, can be dispensed with and noise generation is prevented.

10 Claims, 3 Drawing Sheets

SUPPORT FOR AN AIRBAG HOUSING OF A MOTOR VEHICLE

CROSS-REFERENCE TO RELATED APPLICATION

This application claims the priority, under 35 U.S.C. §119, of German application DE 10 2007 031 406.1, filed Jul. 5, 2007; the prior application is herewith incorporated by reference in its entirety.

BACKGROUND OF THE INVENTION

Field of the Invention

The invention relates to a support for an airbag housing of a motor vehicle, in particular for a knee airbag housing. The support has a support strut connected to the airbag housing.

As is generally known from practice, knee airbags are disposed on a crossmember of the body of a motor vehicle. If the knee airbag triggers or the crossmember is loaded with force, the force is guided into the carrying frame of the motor vehicle.

Published, non-prosecuted German patent application DE 103 12 597 A1 describes a support for a knee airbag housing having a tube being fixed in each case on the end side in the lower region to an A-pillar and to a center strut of a structure crossmember, the center strut being fastened to a center tunnel. The tube is therefore arranged transversely with respect to the vehicle longitudinal direction and can absorb the reaction forces during the inflation of an airbag and the support forces during an impact of the motor vehicle via its connection to the A-pillar and to the center strut and forward them to the attached vehicle body structure. Since the tube is connected fixedly in each case on the inside to the A-pillar and to the center strut, the force is guided through the connecting elements in the case of a loading of the tube with force (for example, by triggering of the knee airbag or any intrusion). In this case, both the tube and the connecting elements can be deformed, an expensive exchange of the tube and the connecting elements being necessary.

Since a conventional tube is connected fixedly on the end side to the A-pillar and to the center strut, an element (for example, a trim part or an airbag housing) which is connected to the tube and is in turn connected to the carrying frame of the vehicle body has to have very high tolerances because there are no possibilities for tolerance compensation.

SUMMARY OF THE INVENTION

It is accordingly an object of the invention to provide a support for an airbag housing of a motor vehicle that overcomes the above-mentioned disadvantages of the prior art devices of this general type.

With the foregoing and other objects in view there is provided, in accordance with the invention, a support for an airbag housing of a motor vehicle. The support contains a support strut connected to the airbag housing and at least one elastic element. The support strut is mounted on a carrying frame of the motor vehicle by way of the at least one elastic element.

The support according to the invention provides for a support strut which carries an airbag or an airbag housing to be mounted in a carrying frame of the vehicle by way of at least one elastic element. As a result of the mounting of the support strut by way of at least one elastic element, connecting elements, for example screws, can be dispensed with and noise generation is prevented. If the support strut is loaded with force (for example, by triggering of the knee airbag or a knee intrusion), the force is guided into the carrying frame by the elastic mounting, by the support strut entering into a form locking or nonpositive connection with the carrying frame. As a consequence of the deformation of the support strut which is caused by an impact or triggering of the knee airbag, only the support strut and no connecting elements has to be exchanged, which makes mounting simpler and reduces the costs.

Moreover, the elastic element makes it possible to receive or fix the knee airbag or other elements which are connected to the support strut in a manner which is insensitive to tolerances.

In one advantageous refinement of the invention, an outer end region, which is provided with an elastic element, of the support strut is clamped in between a mounting elbow which is mounted on an A-pillar and a cockpit carrying frame, and an inner end region, which is provided with an elastic element, of the support strut is held in a support element of the carrying frame, the inner end region, which is provided with the elastic element, of the support strut being pushed into the support element during mounting. This refinement makes particularly simple mounting of the support strut possible.

In accordance with an added feature of the invention, the at least one elastic element is composed of plastic, preferably an elastomeric plastic or rubber.

In accordance with another feature of the invention, the support strut is a profiled tube. The elastic element is disposed between the profiled tube and the carrying frame such that the profiled tube is mounted in the carrying frame in a floating manner.

In accordance with a further feature of the invention, the support strut has end regions and the at least one elastic element is one of a plurality of elastic elements, in each case one of the elastic elements is disposed in each of the end regions of the support strut.

In accordance with another further feature of the invention, the at least one elastic element is adhesively bonded onto the support strut.

In accordance with another additional feature of the invention, as viewed in a driving direction, the airbag housing is disposed in front of the support strut and is screwed to the support strut.

In accordance with a concomitant feature of the invention, the elastic element is an elastic profile surrounding the support strut in a circumferential direction and has an undulating outer profile.

It goes without saying that the features which are mentioned in the above text and are still to be explained in the following text can be used not only in the respectively specified combination, but also in other combinations or alone, without departing from the scope of the present invention.

Other features which are considered as characteristic for the invention are set forth in the appended claims.

Although the invention is illustrated and described herein as embodied in a support for an airbag housing of a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
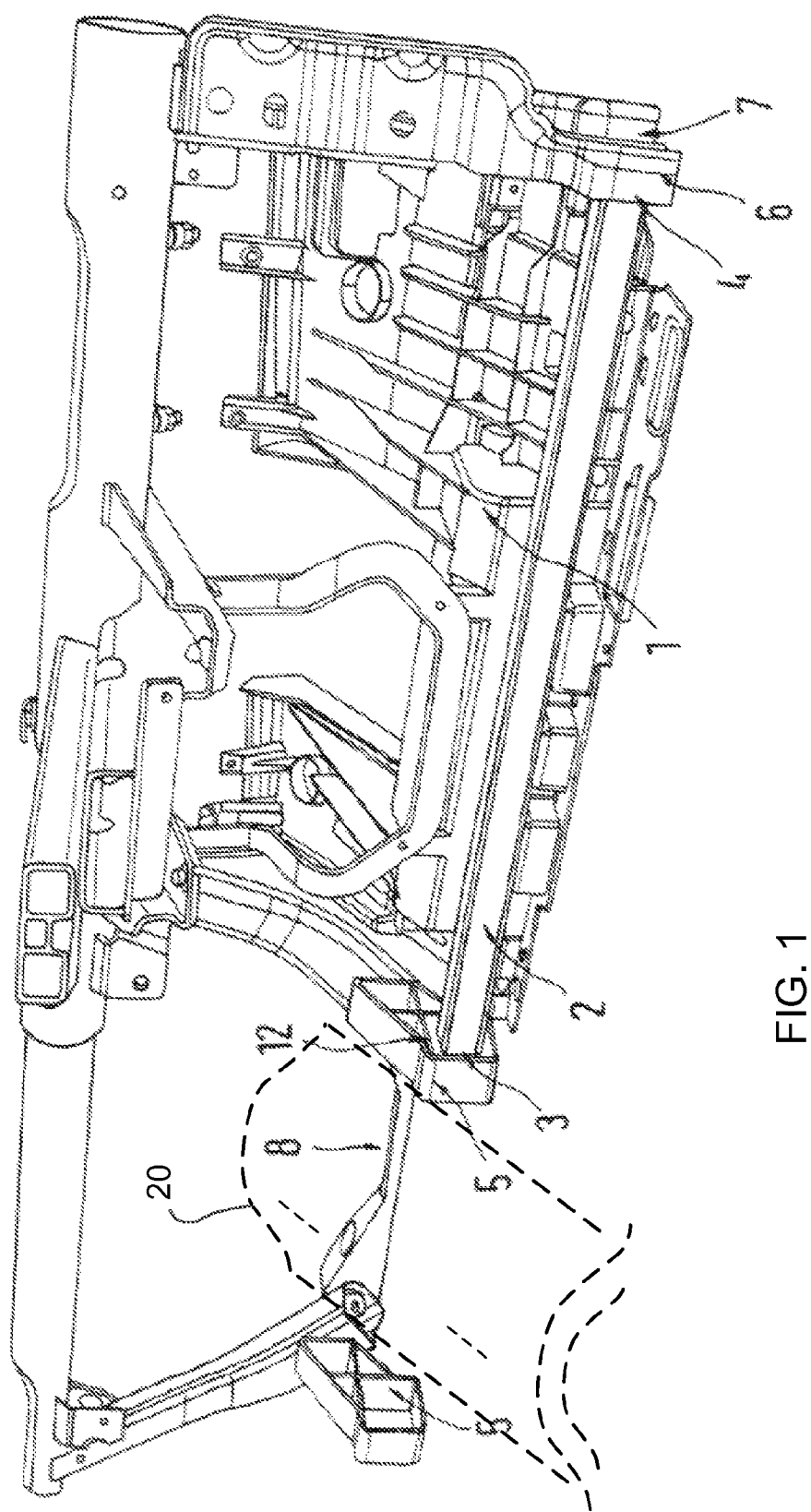
FIG. 1 is a diagrammatic, perspective view of a support according to the invention for a knee airbag housing of a motor vehicle.

Referring now to the figures of the drawing in detail and first, particularly, to FIG. 1 thereof, there is shown a support for an airbag housing of a motor vehicle, in particular for a knee airbag housing 1, according to one preferred embodiment of the invention. As viewed in a driving direction, the knee airbag housing 1 is disposed in front of a support strut 2 which is situated in a lower region of a control panel 10, 11 (see, for example, FIG. 4). FIG. 1 shows the support strut 2 and the knee airbag housing 1 on the driver side of the motor vehicle. It is obvious that the support strut 2 and any airbag housing 1 can likewise be provided on the passenger side of the motor vehicle. The support strut 2 is supported by a carrying frame at end regions 3, 4 of the support strut 2. The carrying frame contains a plurality of elements 5, 6, 7, 8, 9 which are fixed to the vehicle body.

The support element 5 receives a first end 3 of the support strut 2 in an inner region of the vehicle. The support element 5 in turn is connected to a center tunnel 20, schematically shown, of the vehicle by a center strut 8 and a carrying frame element 9. The carrying elements 6, 7 receive a second end of the support strut 2 in an outer region of the vehicle, both on the driver side and on the passenger side.

Figure 4:
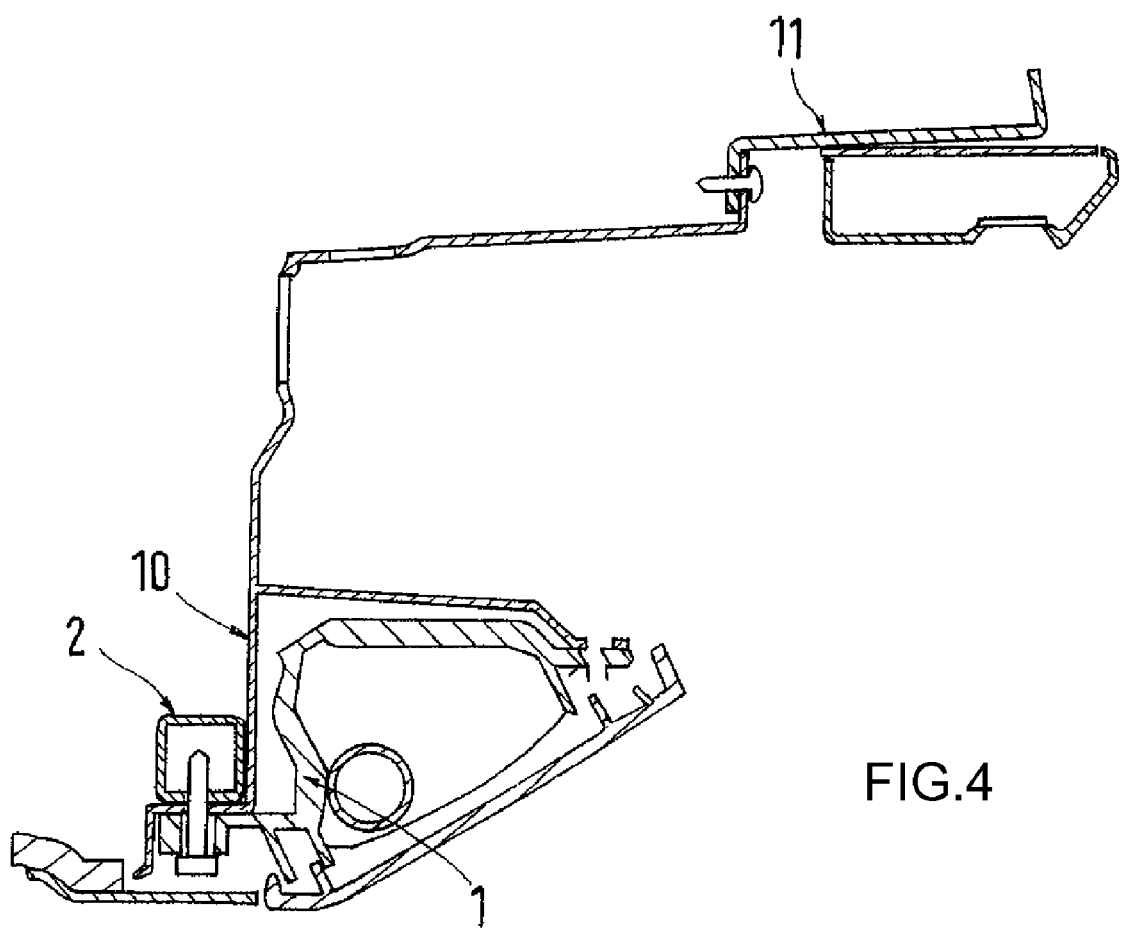
FIG. 4 is a diagrammatic, cross-sectional view through a support for the knee airbag housing of a motor vehicle according to one preferred embodiment of the invention.

FIG. 4 shows a cross section through a support for the knee airbag housing according to one preferred embodiment of the invention. A lower control panel 10 is connected, preferably screwed, to a control panel outer part 11 in a manner which determines the joint; in addition, the lower control panel 10 is connected, likewise preferably screwed, to the support strut 2.

The knee airbag housing 1 is connected, preferably screwed, to the support strut 2. As can be seen from FIG. 4, the knee airbag housing 1 can be screwed to the lower control panel 10 and the support strut 2.

In the event of triggering of the knee airbag or a knee intrusion, the force is consequently guided into the support strut 2 and into the carrying frame elements 5, 6, 7.

Figure 2:
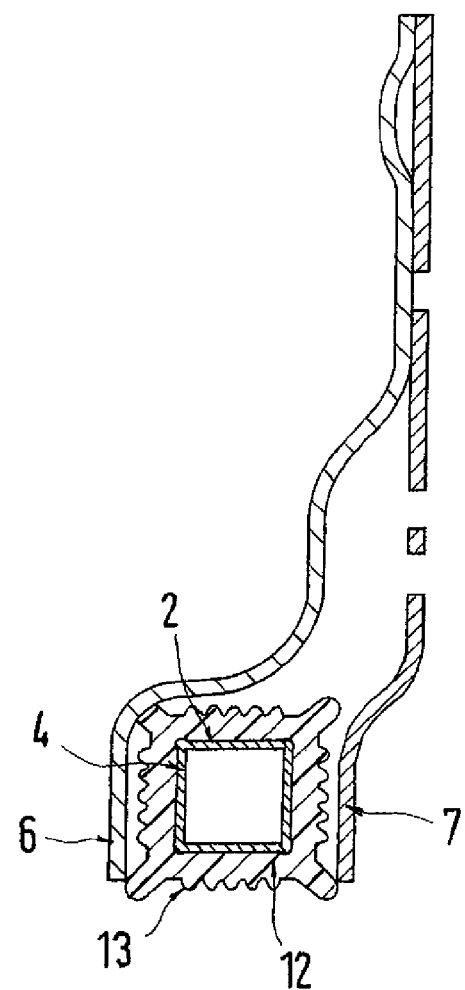
FIG. 2 is a diagrammatic, cross-sectional view through an outer support of the support strut according to one preferred embodiment of the invention.

FIG. 2 shows a cross section through the outer support of the support strut 2 according to one preferred embodiment of the invention. The support strut 2 is a profiled tube which is preferably of rectangular configuration. An end region 4 of the support strut 2 is provided with an elastic element 12. The elastic element 12 is preferably composed of a plastic, in particular of an elastomeric plastic, or of rubber. The elastic element 12 is advantageously adhesively bonded onto the support strut 2. The elastic element 12 lies between the carrying elements 6, 7 and the support strut 2 and can preferably surround or enclose the support strut 2 in the circumferential direction. As can be seen from FIG. 2, an outer profile 13 of the elastic element 12 can have an undulating shape. The carrying element 6 can be a mounting elbow which is premounted and is connected to an A-pillar, and the carrying element 6 can be a cockpit carrying frame. That end region 4 of the support strut 2 which is provided with the elastic element is clamped in between the mounting elbow and the carrying element 7 and is therefore fixed during cockpit mounting. The mounting elbow therefore also serves as support element during triggering of the knee airbag or a knee intrusion.

The support strut 2 is mounted in a floating manner in the carrying frame elements 6, 7 by the elastic element 12. Since the support strut 2 is not screwed or welded but is elastically connected to the carrying frame elements 6, 7 in a loose manner, tolerances which occur are not influenced negatively and joint gaps can be maintained. The required tolerance compensation is ensured by the mounting of the support strut 2 in the carrying frame elements 6, 7 by way of the elastic element 12, and noise generation is prevented, moreover. Only in the case of triggering of the knee airbag or a knee intrusion does the mounting elbow absorb the reaction forces and act in a supporting manner by the elastic mounting blocking and the support strut entering into a form-locking connection with the mounting elbow and guiding the force into the carrying frame. The elastic element 12, preferably made from rubber, is configured in accordance with the force ratio which occurs.

Figure 3:
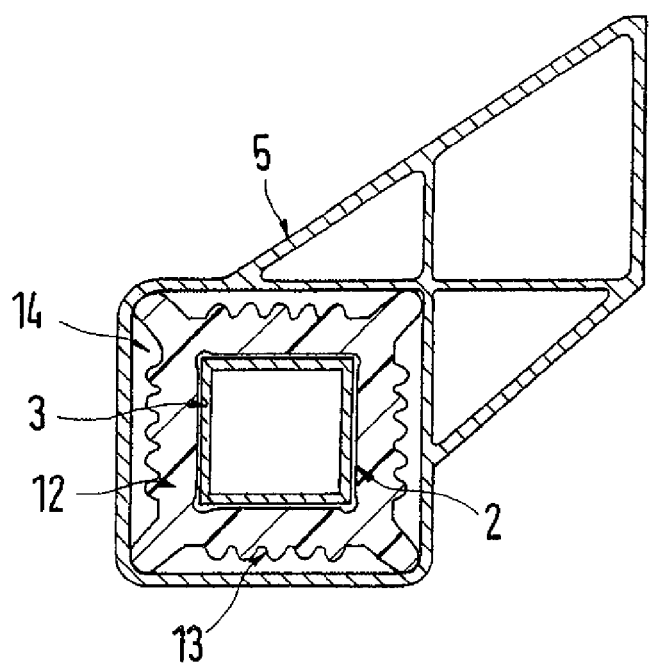
FIG. 3 is a diagrammatic, cross-sectional view through an inner support of the support strut according to one preferred embodiment of the invention.

FIG. 3 shows a cross section through the inner support of the support strut 2 according to one preferred embodiment of the invention. The inner region 3 of the support strut 2 is likewise provided with an elastic element 12 of this type, preferably adhesively bonded to the latter. As has already been mentioned, the support element 5 can be connected to the non-illustrated center tunnel of the vehicle. The support element 5 has an opening 14 for receiving that first end of the support strut 2 which is provided with the elastic element 12. The support strut 2 is therefore mounted in a similar way in a floating manner in the support element 3 and is not screwed or welded to the support element 5. For mounting, that inner end region 3 of the support strut 2 which is provided by the elastic element 12 can be pushed into the support element 5. During mounting, that inner end region 3 of the support strut 2 which is provided with the elastic element is pushed into the support element 5 and that second end of the support strut 2 which is provided with the elastic element is clamped in between the mounting elbow and the carrying element 7 and is therefore fixed during cockpit mounting.

As a result of the elastic support of the support strut 2, the support strut 2 will only be deformed in the case of a crash, or be displaced in the elastic support or be supported elastically. Since the support strut 2 is not welded or screwed to the carrying frame, only a simple exchange of the support strut 2 is required. Moreover, tolerances which occur during the elastic mounting of the support strut 2 are not influenced negatively and joint gaps can be maintained. Moreover, noise generation is prevented by the elastic element 12.

The above description of the exemplary embodiments according to the present invention serves only for illustrative purposes and not for the purpose of restricting the invention. In particular with regard to some preferred exemplary embodiments, a person skilled in the art gathers from them that various changes and modifications in the design and details can be made without deviating from the concept and scope of the invention. Accordingly, the disclosure of the present invention should not be restrictive. Instead, the disclosure of the invention should illustrate the scope of the invention which is shown in the following claims.

The invention claimed is:

1. A support for an airbag housing of a motor vehicle, the support comprising:
   a support strut connected to the airbag housing, said support strut being a profiled tube and having end regions; and
   a plurality of elastic elements, said support strut mounted on a carrying frame of the motor vehicle by way of said elastic elements, one of said elastic elements mounted between said profiled tube and the carrying frame, said elastic elements formed from a plastic, one of said elastic elements provided in each case in said end regions of said support strut;
   one of said end regions of said support strut is an outer end region provided with one of said elastic elements, said outer end region being clamped between a mounting elbow which is mounted on an A-pillar support and a carrying frame, and when the airbag is triggered the mounting elbow serves as a support element.

2. The support according to claim 1, wherein said plastic is an elastomeric plastic.

3. The support according to claim 1, wherein one of said end regions is an inner end region which is provided with one of said elastic elements, said inner end region is held in the support element of the carrying frame, and the support element of the carrying frame is connected to a central tunnel of the vehicle.

4. The support according to claim 1, wherein at least one of said elastic elements is adhesively bonded onto said support strut.

5. The support according to claim 1, wherein as viewed in a driving direction, the airbag housing is disposed in front of said support strut and is screwed to said support strut.

6. The support according to claim 1, wherein said elastic elements are each formed as an elastic profile surrounding said support strut in a circumferential direction and has an undulating outer profile.

7. The support according to claim 1, wherein the support is for a knee airbag housing.

8. A support for an airbag housing of a motor vehicle, the support comprising:
   a support strut connected to the airbag housing, said support strut having end regions;
   a plurality of elastic elements, said support strut mounted on a carrying frame of the motor vehicle by way of said elastic elements, in each case one of said elastic elements disposed in each of said end regions of said support strut; and
   one of said end regions of said support strut is an outer end region provided with one of said elastic elements, said outer end region is clamped in between a mounting elbow which is mounted on an A-pillar support and a cockpit carrying frame of the motor vehicle.

9. The support according to claim 8, wherein when an airbag is triggered, the mounting elbow serves as a support element.

10. A support for an airbag housing of a motor vehicle, the support comprising:
    a support strut connected to the airbag housing and having end regions;
    a plurality of elastic elements, said support strut mounted on a carrying frame of the motor vehicle by way of said elastic elements, one of said end regions of said support strut is an inner end region provided with one of said elastic elements, said inner end region is held in a support element of the carrying frame, it being possible for said inner end region, which is provided with said elastic element, to be pushed into the support element for mounting; and
    the support element of the carrying frame is connected to a center tunnel of the motor vehicle.

* * * * *